United States Patent
Jeong et al.

(10) Patent No.: US 8,754,762 B2
(45) Date of Patent: Jun. 17, 2014

(54) APPARATUS FOR GENERATING OPERATING SOUND OF VEHICLE

(75) Inventors: Ji Hoon Jeong, Daejeon (KR); Moon Seok Lee, Gyeonggi-do (KR); Dong Chul Park, Gyeonggi-do (KR); Ji Min Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 412 days.

(21) Appl. No.: 13/167,957

(22) Filed: Jun. 24, 2011

(65) Prior Publication Data

US 2012/0133503 A1    May 31, 2012

(30) Foreign Application Priority Data

Nov. 29, 2010    (KR) .................. 10-2010-0119783

(51) Int. Cl.
*B60Q 1/22*    (2006.01)

(52) U.S. Cl.
USPC .......................... 340/463; 340/384.3; 381/86

(58) Field of Classification Search
USPC ............ 340/384.3, 388.3, 404.1–404.3, 463, 340/671, 672, 686.3, 691.1, 691.2, 691.7, 340/692, 936; 180/68.2; 181/86, 87.5, 230; 381/86, 87

See application file for complete search history.

(56) References Cited

U.S. PATENT DOCUMENTS

| | | | | |
|---|---|---|---|---|
| 5,517,173 | A * | 5/1996 | Cha et al. .................... | 340/404.1 |
| 7,121,368 | B2 * | 10/2006 | MacKelvie .................. | 180/68.1 |
| 2003/0183433 | A1 * | 10/2003 | MacKelvie .................. | 180/68.1 |
| 2009/0208333 | A1 * | 8/2009 | Smith et al. ...................... | 416/5 |
| 2009/0277707 | A1 * | 11/2009 | Ballard ........................ | 180/68.2 |

* cited by examiner

*Primary Examiner* — Hai Phan
*Assistant Examiner* — Ojiako Nwugo
(74) *Attorney, Agent, or Firm* — Edwards Wildman Palmer LLP; Peter F. Corless

(57) ABSTRACT

Disclosed herein is an apparatus for generating an operating sound of a vehicle, which does not require a separate installation space and thus imposes no spatial limitations on the design of the vehicle. The apparatus includes a rotatable mechanism and a film The rotatable mechanism is driven by a motor, and is provided with a plurality of blades. The film is provided on at least one of the blades, a first end of the film being secured to an edge of the blade and a second end being a free end.

11 Claims, 7 Drawing Sheets

APPARATUS FOR GENERATING OPERATING SOUND OF VEHICLE

CROSS-REFERENCE TO RELATED APPLICATIONS

This application claims under 35 U.S.C. §119(a) priority to Korean Application No. 10-2010-0119783, filed on Nov. 29, 2010, the disclosure of which is incorporated herein by reference in its entirety.

BACKGROUND OF THE INVENTION

1. Field of the Invention

The present invention relates to an apparatus for generating an operating sound of a vehicle and, more particularly, to an apparatus for generating an operating sound of a vehicle, which is used in an electric driven vehicle to inform a pedestrian of the presence of the vehicle.

2. Description of the Related Art

Noise generated from an electric vehicle (EV) is driven at low speed is less than the noise generated by a traditional internal combustion engine vehicle. A hybrid electric vehicle (HEV) driven by a motor also generates a small amount of noise.

The very small amount of noise created from an electric driven vehicle causes problems, however, in that a pedestrian is not easily aware of the vehicle in question. In order to overcome the problem, current vehicle makers have proposed a speaker installed in a front bumper or an engine room to generate a virtual engine sound, thus allowing a pedestrian to be aware of an oncoming vehicle.

The size of the hybrid electric vehicle or electric vehicle which is being developed recently is quite small, however. Thus, the engine room of the small-sized vehicle is too small to accommodate the large capacity speaker that may generate a low-frequency band sound. Further, a separate space for accommodating the speaker imparts a burden on the vehicle maker.

SUMMARY OF THE INVENTION

Accordingly, the present invention has been made keeping in mind the above problems occurring in the related art, and an object of the present invention is to provide an apparatus for generating an operating sound of a vehicle, which does not require a separate installation space and thus imposes no spatial limitations on the design of the vehicle.

Another object of the present invention is to provide an apparatus for generating an operating sound of a vehicle, which may be applied to an existing vehicle, thereby enabling the to operating sound to be easily tuned, and have a simple structure.

The present invention provides an apparatus for generating an operating sound of a vehicle, including a rotating mechanism, e.g., a fan, driven by a motor and having a plurality of blades, a control unit for driving the motor, and a film provided on at least one of the blades, a first end of the film being secured to an edge of the blade and a second end being a free end.

According to an aspect of the present invention, the fan may be rotatable in opposite directions, and the film may be provided on the blade such that the second end thereof is put in close contact with a surface of the blade by wind flowing to a leading edge of the blade when the fan rotates in either of the directions.

According to another aspect of the present invention, the control unit may perform control such that the fan rotates in a first direction when a speed is less than a preset reference value, and the fan rotates in a second direction when the speed is the reference value or higher.

According to a further aspect of the present invention, a metallic member may be provided on the second end of the film, and an electromagnet may be provided on a portion of the blade corresponding to the metallic member.

According to another aspect of the present invention, the control unit may perform control such that the electromagnet is turned on when a speed is a preset reference value or higher, and the electromagnet is turned off when the speed is less than the reference value.

According to another aspect of the present invention, the first end of the film may be secured to a trailing edge of the blade, and the second end may be placed on a back of the blade with respect to the leading edge.

BRIEF DESCRIPTION OF THE DRAWINGS

The above and other objects, features and advantages of the present invention will be more clearly understood from the following detailed description when taken in conjunction with the accompanying drawings, in which:

FIGS. 4A and 4B are schematic views showing a fan according to another exemplary embodiment of the present invention, in which FIG. 4A is a view showing the fan functioning as a radiator fan, and FIG. 4B is a view showing the fan functioning to generate the operating sound of a vehicle.

DETAILED DESCRIPTION OF THE INVENTION

Hereinafter, an apparatus for generating an operating sound of a vehicle according to the preferred embodiment of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
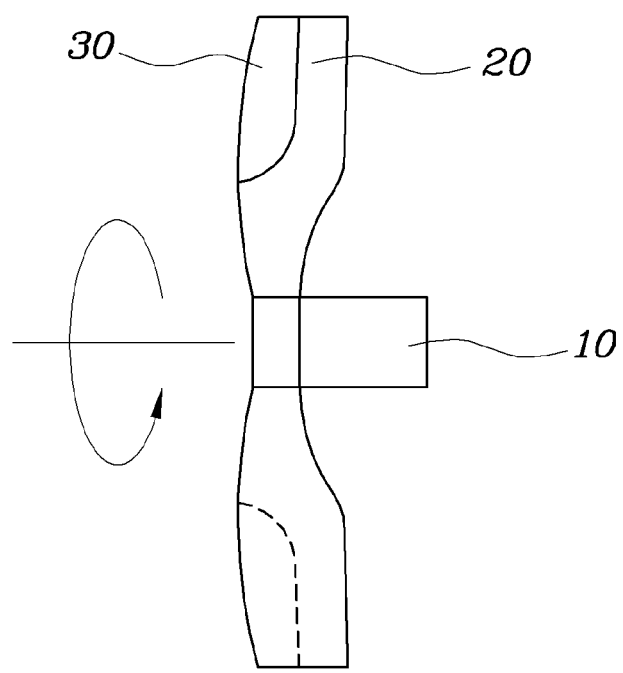
FIG. 1 is a schematic view showing a fan according to an exemplary embodiment of the present invention.
Figure 2A:
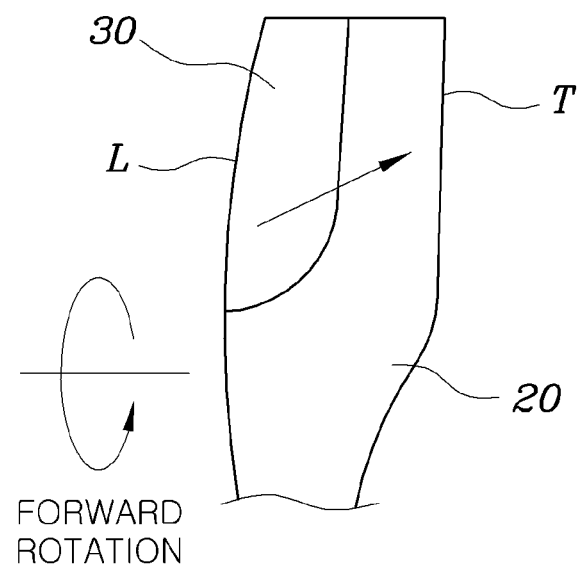
FIG. 2A is a view showing the fan of FIG. 1 functioning as a radiator fan.
Figure 2B:
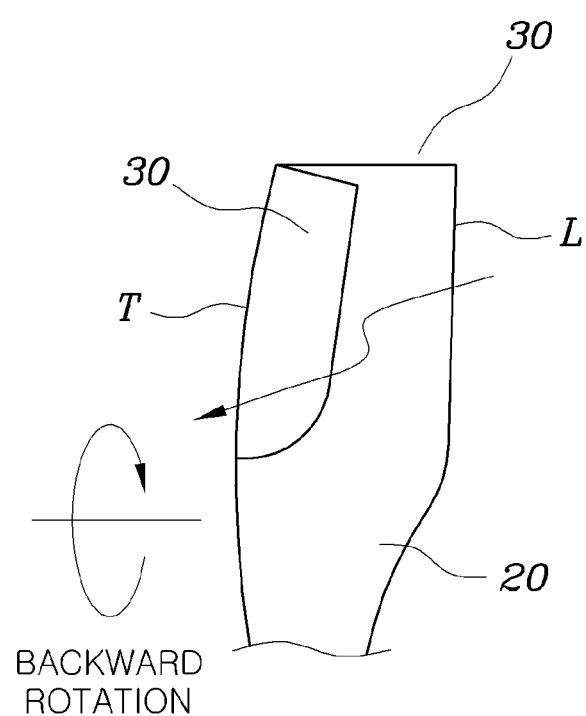
FIG. 2B is a view showing the fan of FIG. 1 functioning to generate the operating sound of a vehicle.
Figure 3:
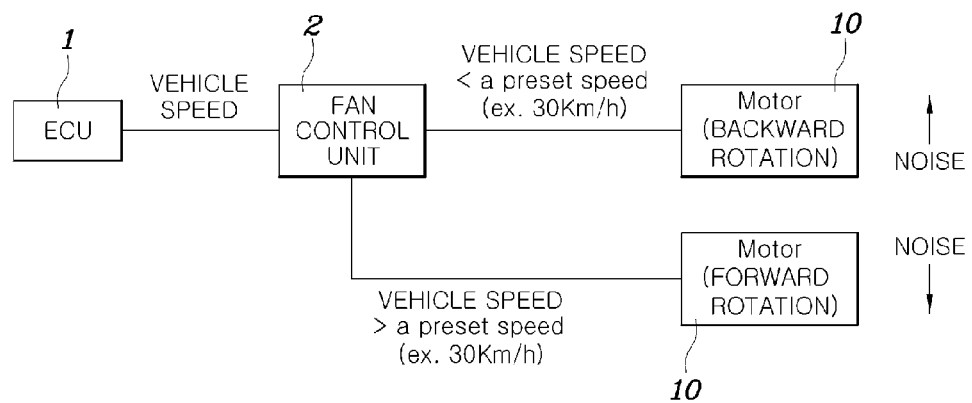
FIG. 3 is a block diagram illustrating the operating logic of an apparatus for generating an operating sound of a vehicle, according to an exemplary embodiment of the present invention.

Referring to FIGS. 1 to 3, the apparatus for generating the operating sound of the vehicle according to the exemplary embodiment of the present invention is constructed so that a film 30 for generating noise is attached to a blade 20 of a fan which is driven by a motor 10.

In some embodiments of the present invention, the fan is, for example, a radiator fan which is installed in a front portion of the vehicle to lower the temperature of an engine compartment/room, and is provided with a plurality of blades 20. For example, the film 30 is attached to each of the blades 20.

Referring to FIG. 2A, a first end of the film 30 is secured to an edge of the blade 20. A second end of the film 30 is a free end which may flutter in the wind. As an example, the first end of the film 30 is secured to a leading edge L of the blade 20 which rotates forwards. The film 30 comes into close contact with a surface of the blade 20 by the wind (shown by the arrow of FIG. 2A) which flows to the leading edge L, so that the film 30 does not generate noise.

Referring to FIG. 2B, when the blade 20 rotates backwards, the first end of the film 30 is placed on a trailing edge T of the blade 20. Thus, the second end of the film 30 is separated from the surface of the blade 20 and fluttered by the wind which flows to the leading edge L, thus generating noise.

In FIGS. 2A, 2B and the other drawings, it is to be understood that the blade 20 is schematically shown. As is well known to those skilled in the art, the blade 20 has a streamlined shape which is inclined at an oblique angle.

The apparatus for generating the operating sound of the vehicle according to the embodiment of the present invention will be described with reference to FIG. 3.

As shown in FIGS. 2A and 2B, the operating sound generating apparatus according to the illustrative embodiment includes the fan which is driven by the motor 10, the film 30 and control units 1 and 2. The control units include an ECU 1 and a fan control unit for driving the motor 10.

When the vehicle is moving at high speed, for example, at the speed of 30 km/h or higher, the control units 1 and 2 perform control such that the motor 10 rotates forwards, thus preventing noise from being generated by the film 30. As shown in FIG. 2A, when the motor 10 rotates to forwards, the second end of the film 30 comes into close contact with the blade 20 by the wind.

In contrast, when the driving speed of the vehicle is low, for example, the vehicle speed is less than 30 km/h, the control units 1 and 2 perform control such that the motor 10 rotates backwards to generate noise using the film 30 as shown in FIG. 2B, thus informing a surrounding pedestrian that the vehicle is coming close to the pedestrian.

Figure 4A:
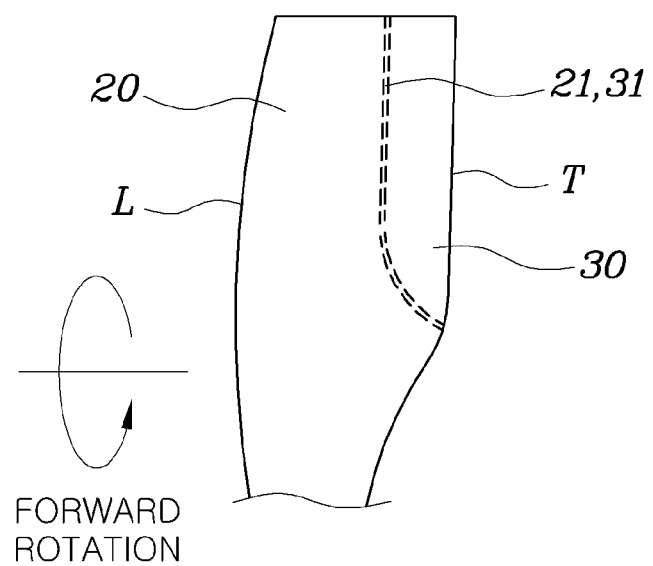
Figure 4B:
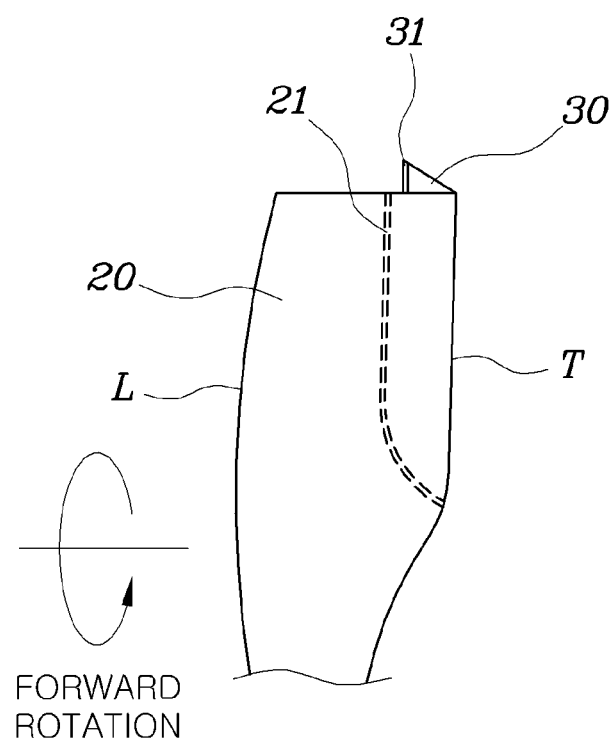

FIGS. 4A and 4B show a fan according to another embodiment

The fan shown in FIG. 4A is different from the fan of the above embodiment in that the position at which a film 30 is installed is different from that of the above embodiment, the rotating direction of a blade 20 is not changed, and an electromagnet is used.

According to this embodiment, a first end of the film 30 is secured to a trailing edge of the blade 20 which rotates forwards, while a second end is a free end. Such a film 30 is placed on the back of the blade 20 with respect to the leading edge L.

A metallic member 31 is provided on the second end of the film 30 in such a way as to be placed along the edge thereof, and the electromagnet is provided on a surface of the blade 20 to correspond to the metallic member 31. As the electromagnet is turned on or off (supplying or cutting off the power), the second end of the film 30 may be in close contact with or be separated from the blade 20.

As shown in FIG. 4A, if the blade 20 rotates forwards, wind does not flow strongly to the second end of the film 30 which is placed on the back of the blade 20. In such a state, if the electromagnet is turned on, the film 30 comes into close contact with the blade 20, so that noise is not generated.

Referring to FIG. 4B, if the electromagnet 21 is turned off when the blade 20 rotates forwards, the second end of the film 30 is separated from the surface of the blade 20 by the wind, so that it flutters and thus generates noise.

Meanwhile, power may be supplied to the electromagnet 21 by connecting an electric wire supplied to the motor 10 to the electromagnet 21. In FIGS. 4A and 4B, the electromagnet 21 and the metallic member 31 have the shape of a band, but may have different shapes accordingly.

Figure 5:
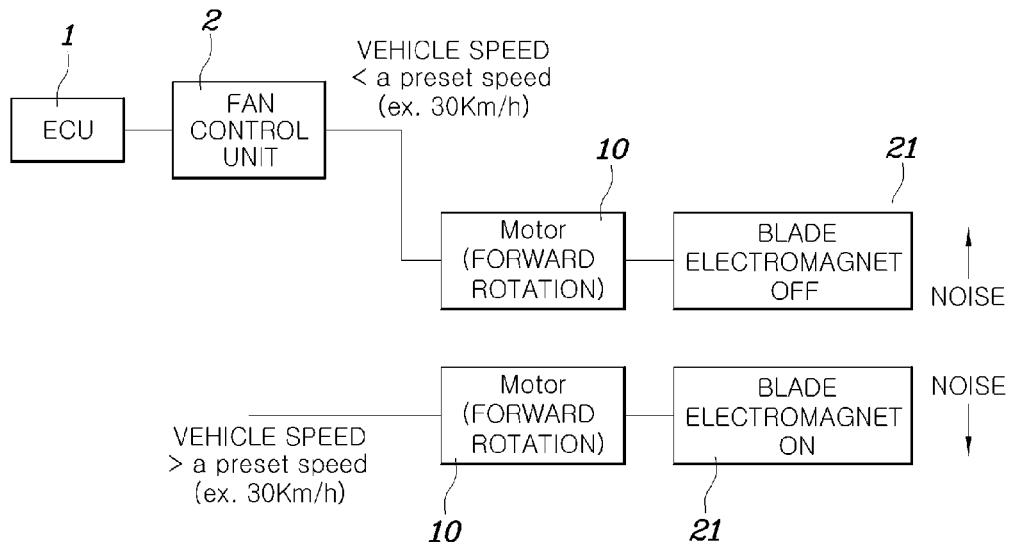
FIG. 5 is a block diagram illustrating the operating logic of an apparatus for generating an operating sound of a vehicle, according to another exemplary embodiment of the present invention.

An apparatus for generating an operating sound of a vehicle according to another embodiment will be described with reference to FIG. 5.

The operating sound generating apparatus according to this embodiment includes the fan which is driven by the motor 10 as shown in FIGS. 4A and 4B, the film 30, and control units 1 and 2.

When the vehicle moves at high speed, for example, at the speed of 30 km/h or higher, the control units perform control such that the electromagnet 21 is turned on, thus preventing noise from being generated by the film 30. As shown in FIG. 4A, when the motor 10 rotates forwards, the second end of the film 30 is attached to the blade 20 by a magnetic force.

In contrast, when the driving speed of the vehicle is low, for example, the vehicle speed is less than 30 km/h, the control units 1 and 2 perform control such that the electromagnet 21 is turned off to generate noise using the film 30, thus informing a surrounding pedestrian that the vehicle is coming close to the pedestrian.

Meanwhile, the frequency of noise generated when the fan rotates is equal to a value obtained by multiplying the revolutions per minute (RPMs) of the motor by the number of blades. Thus, the frequency may be controlled using the rotating speed of the fan. Further, by changing the number, size, and shape of films in place of blades, it is possible to easily generate a low frequency noise which is soft and is not harsh.

Based on the results of testing for blind people a sound similar to an engine sound, a low frequency sound which is soft and strong can be more easily recognized than can a high frequency sound. The operating sound generating apparatus according to the present invention is thus advantageous in notifying pedestrians that a vehicle is coming toward them.

Furthermore, although the above embodiments have been described in terms as a fan, it is understood that any mechanism that rotates around an access in a circular manner could be used in the present invention to achieve the same results.

As described above, the present invention provides an apparatus for generating an operating sound of a vehicle, which does not require a separate installation space when the to apparatus is applied to an existing radiator fan, and imposes no spatial limitations on the design of the vehicle. Further, the present invention provides an apparatus for generating an operating sound of a vehicle, which may be applied to an existing vehicle. Furthermore, the present invention provides an apparatus for generating an operating sound of a vehicle, which makes it easy to tune the operating sound by controlling the rpm of a fan, the number of blades, and the number, shape, and size of films Even further, the present invention provides an apparatus for generating an operating sound of a vehicle, which has a simple structure, so that it is easy to manufacture and install, in addition to reducing a manufacturing cost.

Although the embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for generating an operating sound of a vehicle, comprising:
   a fan driven by a motor and having a plurality of blades;
   a control unit for driving the motor; and
   a film provided on at least one of the blades, a first end of the film being secured to an edge of the blade and a second end being a free end,
   wherein a metallic member is provided on the second end of the film, and an electromagnet is provided on a portion of the blade corresponding to the metallic member.

2. The apparatus as set forth in claim 1, wherein
   the fan is rotatable in opposite directions, and
   the film is provided on the blade such that the second end thereof is put in close contact with a surface of the blade by wind flowing from a leading edge to a trailing edge of the blade when the fan rotates in either of the directions.

3. The apparatus as set forth in claim 2, wherein the control unit performs control such that the fan rotates in a first direction when a speed is less than a preset reference value, and the fan rotates in a second direction when the speed is the reference value or higher.

4. The apparatus as set forth in claim 1, wherein the control unit performs control such that the electromagnet is turned on when a speed is a preset reference value or higher, and the electromagnet is turned off when the speed is less than the reference value.

5. The apparatus as set forth in claim 1, wherein the first end of the film is secured to a trailing edge of the blade, and the second end is placed on a back of the blade with respect to the leading edge.

6. An apparatus for generating an operating sound of a vehicle, comprising:
   a rotatable mechanism driven by a motor and having a plurality of blades;
   a control unit for driving the motor; and
   a film provided on at least one of the blades, a first end of the film being secured to an edge of the blade and a second end being a free end,
   wherein a metallic member is provided on the second end of the film, and an electromagnet is provided on a portion of the blade corresponding to the metallic member.

7. The apparatus as set forth in claim 6, wherein
   the rotatable mechanism is rotatable in opposite directions, and
   the film is provided on the blade such that the second end thereof is put in close contact with a surface of the blade by wind flowing to a leading edge of the blade when the rotatable mechanism rotates in either of the directions.

8. The apparatus as set forth in claim 7, wherein the control unit performs control such that the rotatable mechanism rotates in a first direction when a speed is less than a preset reference value, and the rotatable mechanism rotates in a second direction when the speed is the reference value or higher.

9. The apparatus as set forth in claim 6, wherein the control unit performs control such that the electromagnet is turned on when a speed is a preset reference value or higher, and the electromagnet is turned off when the speed is less than the reference value.

10. The apparatus as set forth in claim 6, wherein the first end of the film is secured to a trailing edge of the blade, and the second end is placed on a back of the blade with respect to the leading edge.

11. A method comprising:
    determining, by a control unit whether or not a vehicle is traveling above a predetermined speed;
    in response to determining that the vehicle is traveling above a predetermined speed, controlling a rotating mechanism to move in a first direction by a motor to prevent a noise from being generated by a film attached to a blade of the rotating mechanism; and
    in response to determining that the vehicle is traveling below a predetermined speed, controlling the rotating mechanism to rotate in a second direction, which is opposite the first direction, to generate a noise by the film attached to the blade of the rotating mechanism.

* * * * *